US008003001B1

(12) United States Patent
Kaiser et al.

(10) Patent No.: US 8,003,001 B1
(45) Date of Patent: Aug. 23, 2011

(54) EASILY REMOVABLE BREAKABLE GEL FOR FIREFIGHTING, EXPLOSION SUPPRESSION AND METHOD OF USE

(76) Inventors: Conard E. Kaiser, Houston, TX (US); Jock R. Collins, Houston, TX (US); James R. Collins, Houston, TX (US)

( * ) Notice: Subject to any disclaimer, the term of this patent is extended or adjusted under 35 U.S.C. 154(b) by 727 days.

(21) Appl. No.: 11/893,680

(22) Filed: Aug. 15, 2007

Related U.S. Application Data

(60) Provisional application No. 60/838,073, filed on Aug. 15, 2006.

(51) Int. Cl.

| | |
|---|---|
| *A62D 1/00* | (2006.01) |
| *A62C 5/033* | (2006.01) |
| *A62C 5/00* | (2006.01) |
| *A62C 2/00* | (2006.01) |
| *A62C 3/00* | (2006.01) |
| *C09K 21/00* | (2006.01) |

(52) U.S. Cl. ............. 252/2; 252/8.05; 252/611; 169/44; 169/46

(58) Field of Classification Search .................... 169/14, 169/43, 44, 46, 47; 252/2, 3, 8.05, 601, 602, 252/605, 607–611; 106/18.11; 507/239; 524/239

See application file for complete search history.

(56) References Cited

U.S. PATENT DOCUMENTS

| | | | |
|---|---|---|---|
| 3,758,641 | A | 9/1973 | Zweigle |
| 4,978,460 | A | 12/1990 | Von Blucher et al. |
| 5,190,110 | A | 3/1993 | Von Blucher et al. |
| 5,518,638 | A | 5/1996 | Buil et al. |
| 5,919,393 | A | 7/1999 | Flynn et al. |
| 5,989,446 | A | 11/1999 | Hicks et al. |
| 6,107,413 | A | 8/2000 | Mori |
| 6,197,415 | B1 | 3/2001 | Holman |
| 6,201,050 | B1 | 3/2001 | Kaiser et al. |
| 6,245,252 | B1 | 6/2001 | Hicks et al. |
| 6,447,697 | B1 | 9/2002 | Vandersall |
| 6,517,747 | B2 | 2/2003 | Vandersall |
| 6,518,345 | B2 | 2/2003 | Tanaka et al. |
| 6,776,920 | B1 | 8/2004 | Reed |
| 7,033,526 | B2 | 4/2006 | Figiel et al. |
| 2005/0045849 | A1 * | 3/2005 | Sortwell ...................... 252/8.05 |

* cited by examiner

*Primary Examiner* — Darren W Gorman

(74) *Attorney, Agent, or Firm* — Kenneth A. Roddy

(57) ABSTRACT

An easily breakable variable viscosity gel composition comprising a mixture of water, pH adjusting agents, gelling agents, and property enhancing additives evenly dispersed into the mixture, and an alkaline electrolyte viscosity increasing agent that raises the pH of the mixture to instantaneously trigger formation of a smooth homogeneous stable gel of desired viscosity for firefighting and fire suppression, explosion suppression and other uses. The gel also has the capacity to cling to, and build upon, vertical and horizontal surfaces which deprives fires of air while simultaneously profoundly and almost instantly lowering the temperature of the burning fuel, yet when effortlessly broken to a liquid by the simple addition of calcium or similar compositions, is easily rinsed away as a non-hazardous environmentally safe liquid. Additionally, when used to surround explosives, the gel grants exceptional explosion suppression.

12 Claims, 1 Drawing Sheet

EASILY REMOVABLE BREAKABLE GEL FOR FIREFIGHTING, EXPLOSION SUPPRESSION AND METHOD OF USE

CROSS REFERENCE TO RELATED APPLICATION

This application claims priority of U.S. Provisional Application Ser. No. 60/838,073, filed Aug. 15, 2006.

BACKGROUND OF THE INVENTION

1. Field of the Invention

This invention relates generally to fire protection, prevention and fire extinguishing and explosion suppressing compositions and methods, and more particularly to fire protection, prevention and fire extinguishing and explosion suppressing compositions and methods using variable viscosity breakable gelled water formulations that hold a layer of water of desired viscosity and thickness where placed but then is easily removed by the application of a second powdered or water based component that breaks the gel so it becomes free flowing and is easily rinsed away.

2. Background Art

In addition to being inexpensive and usually readily available, water has the advantage of its capacity to deprive fires of oxygen as well as its high heat transfer capacity so it quickly and efficiently cools the fuel below their combustion temperature. Water is relatively inexpensive and it is usually easy to deliver to the fire while firefighters remain at safe distances. For these and other reasons water endures as an important fire control and extinguishing agent.

Although the efficiency of water as a fire extinguishing agent is well known, it has serious drawbacks. Water quickly and easily gravitates off surfaces to which it is applied and therefore may not have smothered the fire or cooled the burning material to below its fire point. Water that immediately runs off a surface offers only limited cooling and most of the potential water use advantages are quickly lost as the water drains away. Liquid water rapidly drains away with any remainder quickly evaporating from a heated surface. Liquid water must be continuously applied to effectively cool a hot surface. Flooding with large quantities of water has another major drawback that can add significantly to the collateral damage of fire fighting—not only the water damage itself but also by spreading any contaminants that may have been present at the site of the fire.

Three things are required for fires to occur and continue, also known as a "fire triangle". They are: (1) the presence of a flammable material, (2) air (oxygen), and (3) sufficient heat to raise the temperature of the fuel above its fire point. An initial spark or igniter is usually required to start a fire.

Due in part to availability, the least costly method to suppress fires is to use water to deprive a fire of oxygen and, at the same time, lower the combustion threshold thereby removing two sides of the theoretical fire triangle; the fuel and an ignition source may still be present. In addition to smothering fire, depriving it of oxygen, keeping water in continuous contact with burning or hot fuel will cause rapid cooling. Water efficiently absorbs heat and therefore lowers the heat level of most fuels to below their flash point and fire points. The fire point is the minimum temperature at which a fuel will continue to burn without additional application of external heat.

Liquid water is 30 times more efficient than air in cooling. Scientifically, the heat transfer coefficient of air is 0.02 $W/m^2K$ and the heat transfer coefficient of water is 0.6

$W/m^2K$ where W=watts, $m^2$=square meters, and K=degrees Kelvin. Since 0.02 is 1/30 of 0.6, the cooling efficiency of liquid water is thirty times that of air. But this applies only if the water is and remains a liquid; the material is cooled only from the boiling point of water downward to the temperature of the applied water.

The vast majority of the cooling efficiency of water in fire fighting is due to fuel heat removal that occurs when water is converted from liquid to vapor, from a fluid into steam. The basis for this effectiveness is the latent heat of vaporization of water. The latent heat of vaporization (or more properly, the standard enthalpy change of vaporization, $\Delta_v H^{\ominus}$) is the amount of energy required to transform a given quantity of a liquid into a gas (e.g., water into steam). When water is heated to its boiling point, tremendous additional heat is required to then convert the liquid water to water vapor at the same temperature. Raising the temperature of one gram of water one degree C. requires one calorie. At 100 degrees C. (212° F.) an additional 540 calories are then required transform that same gram of liquid water to steam, still at 100 degrees C. As the water vaporizes, heat is instantaneously carried away thus rapidly cooling the fuel. When the fuel is sufficiently cooled, it will not support a flame; the fire ceases and re-ignition will not occur.

This phenomenon is obvious as one observes the changes in color of the smoke emanating from most fires when sprayed with water. Smoke is an air suspension of small particles that result from the incomplete combustion of a fuel—the incomplete oxidation of a carboniferous fuel to carbon dioxide and water. Carbon is seen as soot, either in black rising microscopic particles of smoke or in falling flakes, etc. When water contacts the fuel, the color of the rising "smoke" almost instantly turns white. However, this "white smoke" is not typical smoke but is steam (vaporized water). As the steam rises, it carries vast amounts of heat away thus efficiently lowering the fuel temperature.

This sequence is much like the series of events which occur when a piece of red hot steel is immersed in water. There is an instant production of hot steam which almost instantly lowers the temperature of the metal to the boiling point of water as the liquid water is converted to steam which then carries the heat into the atmosphere. As long as sufficient water remains present, further cooling continues at a slower rate until the metal reaches the temperature of the surrounding water.

Von Blucher, U.S. Pat. No. 5,190,110 addressed some of the disadvantages of using liquid water by using absorbent polymers with particle sizes from 20 to 200 microns dispersed in a water miscible media to be incorporated into the water by stirring or pumping thereby producing thickened water for fire control. Much time is required for the polymer particles to absorb water and swell whether the solid granules are pre-mixed or added directly in advance of the nozzle while they are in the non-swollen condition. In the aqueous system taught by von Blucher, from 50% to 80% by weight, preferably from 60% to 70% by weight, of the overall amount of water is present in the swelled particles. Following their use in fire fighting or prevention, the accumulations are difficult to remove during the cleanup operations and can add significantly to the cleanup damage and costs.

Von Blucher, U.S. Pat. No. 4,978,460 discloses a process of using solid polymer particles encased by a water-soluble release agent to avoid agglutination of the particles. These solid granular particles may take from ten seconds to several minutes to expand; far too long to be practical due to the limited time it takes for the water to pass through a fire hose. This von Blucher patent also requires large quantities of the relatively expensive thickening agents to achieve good results. Furthermore residual accumulation of these thickening agents causes cleanup complications once the fire is extinguished. Although extinguishing fires is the most critical aspect of the fire fighter's responsibilities, cleanup following the dousing of the fire is also a major concern.

Zweigle, U.S. Pat. No. 3,758,641 discloses the use of solid granular polymer particles with high water absorption for fire extinguishing purposes but this process is best accomplished with highly specialized fire fighting equipment and the applied material is difficult to remove once applied. This method also leaves high concentrations of contaminants after the fire has been controlled.

Buil, U.S. Pat. No. 5,518,638 discloses the use of thickened amorphous silica in water as a fire extinguishing and protective agent. Silica simply thickens water but water so thickened does not withstand rapid evaporation in the presence of the heat of the fire. The residual is very difficult to remove from the surfaces it contacts, especially when somewhat or completely dried; this adds significantly to cleanup.

Reed, U.S. Pat. No. 6,776,920 discloses the use of a heat absorbing water based material for fire fighting and other uses. This material requires the use of two different formulations which are passed through magnetic fields to formulate the final product. The resultant applied gel is not easily removed or breakable.

Hicks et al, U.S. Pat. Nos. 5,989,446 and 6,245,252 disclose a method for applying for applying polymer particles to a surface to combat fires using cross-linked, water-swellable polymer particles made by inverse phase polymerization reaction in the form of a water-in-oil emulsion. This water-absorbent combination is added to fire fighting water in amounts sufficient to increase the viscosity of the water-additive mixture. Although these formulations result in increased viscosity water that has some fire protective capacity, they are composed simply of a polymer in a water-in-oil emulsion.

Inverse phase polymerization reactions and emulsions are well known. Those skilled in the art know this is usually done in a water/oil emulsion as in the Hicks et al '446 and '252 patents. The emulsion enhances even distribution of the polymer but delays viscosification. Also, spraying oils on fires in an attempt to suppress a fire is not usually recommended by firefighters both because of the potential for ignition of the hydrocarbon and also the potential for release of toxic volatile organic compounds from the heated hydrocarbons. Emulsifiers are essential in the '446 and '252 patents and in similar patents to produce the inverse phase polymerization reaction required to produce the carrier water/polymer or water/oil end product with the polymer in the internal phase.

Unlike the Hicks et al patents '446 and '252 and similar patents that require emulsifiers and oils to produce the inverse phase polymerization reaction, the present invention employs water soluble cross-linked polyacrylic acid polymers, therefore no emulsifiers or oils are required and there is no swelling of an oil encapsulated water/oil internal phase The Hicks et al patents '446 and '252 and previously patented thickened water products are also relatively stable with characteristics that make them difficult to remove when the fire is suppressed and the fire danger has passed. Fire damage is furthered by accumulations of the applied materials plus the subsequent water damage resulting from the high volumes of water required to flush away the applied materials.

Our previous patent, U.S. Pat. No. 6,201,050, which is hereby incorporated by reference herein in its entirety, discloses a viscous breakable gel additive carrier for mixing with ion containing materials, including dry powder based and calciferous materials, which in its uniform homogeneous gel form, prevents separation and settling of the additives prior to mixing, and upon mixing with the ion containing materials liquefies and becomes totally and evenly miscible to allow easy and precise mixing. The gel includes formulations of selected additives thoroughly mixed with a cross-linked polyacrylic acid gelling agent, an organic chelating agent, and an alkaline electrolyte to produce uniform homogeneous mortars, grouts, stuccos and other compositions.

The present invention relates to fire protection, prevention and fire extinguishing and explosion suppressing compositions and more particularly to variable viscosity water formulations composed of breakable gelled water which acts to hold a layer of water of desired viscosity and thickness where placed but then is easily removed by the addition of a second powdered or water based component that breaks the gel so it becomes free flowing and is easily rinsed away.

SUMMARY OF THE INVENTION

The present invention overcomes the aforementioned problems and is distinguished over the prior art in general, and these patents in particular by fire protection, prevention and fire extinguishing and explosion suppressing compositions and methods using an easily breakable variable viscosity gel composition comprising a "base" liquid mixture of water, pH adjusting agents, gelling agents, and property enhancing additives, and an alkaline electrolyte viscosity increasing "activator" agent that raises the pH of the mixture to instantaneously trigger formation of a smooth homogeneous stable gel which holds a thick layer of water on the surfaces to which it is applied and is easily removed by spraying with a second powdered or water based "breaker" component that breaks the gel so it becomes free flowing and is easily rinsed from surfaces to which it was applied. The gel has the capacity to cling to, and build upon, vertical and horizontal surfaces which deprives fires of air while simultaneously profoundly and almost instantly lowering the temperature of the burning fuel, and when broken to a liquid and rinsed away is as a non-hazardous environmentally safe liquid. Additionally, when used to surround explosives, the gel grants exceptional explosion suppression.

The breakable gel of the present invention is stable yet easily removed following the passage of the fire danger. Simply sprinkling or spraying the applied gel with additional water, preferably the "breaker" component containing cations, such as calcium, causes the gel to break to free-flowing liquid water leaving no residual contamination. The positively charged ions neutralize the negatively charged sites on the polymer molecular backbone causing the polymer molecules to again fold eliminating the gel supporting lattices of the straightened cross-linked polymers; the gel breaks. Additionally, the cations of elements such as calcium precipitate the polymers from the water carrier thus further increasing liquidity of the water carrier. Since the chemical content of the present invention are listed as environmentally safe, especially in the low concentrations utilized, when the gel becomes free-flowing water it then simply drains away leaving no environmental hazard.

Another feature and advantage of the present invention is that it provides the firefighter with a breakable gelled water that is easily and economically produced, and is easily applied with existing, commonly available, fire fighting equipment.

Another feature and advantage of the present invention is that it provides a breakable gel which delivers rapid superior fire extinguishing characteristics through trilateral compromise of all three sides of the "Fire Triangle"—air (oxygen) deprivation, isolation of the fuel, and substrate (fuel) cooling.

Another feature and advantage of the present invention is that the gelled water forms instantly without having to wait for swelling of thickening components that could take many seconds to minutes or more.

Another feature and advantage of the present invention is that the gel that can be applied using commonly available fire fighting equipment where water containing the "base" formulation can be pumped through a nozzle fitted with an eductor or other proportioning device which adds the "activator" chemicals so that the gel does not form until it has actually left the spray nozzle. This precludes and prevents plugging of spray nozzles. Only liquids pass through the nozzle; the gel instantly forms in the air as a result of instant mixing after leaving the nozzle.

Another feature and advantage of the present invention is that it can be sprayed as a liquid and form a gel in the air or on a sprayed surface instantaneously upon contact thereby forming a uniform layer of gelled water both in thickness thereof and in total coverage. The avoidance of gaps in coverage is vital for sparks flying from nearby fires can be expected to fall on all surfaces including gaps in the coverage of gelled water applied by spraying of a formed gel. The suppression and extinguishing of sparks rather than extinguishing surfaces already burning most easily and efficiently controls the spreading of fire.

Another feature and advantage of the present invention is that the gel is easily produced from mobile fire fighting trucks thus allowing a truck to distribute an expanse of gel in advance of grass, brush, or forest fires. Since the water-laden gel clings to the upper aspects of the sprayed tinder, approaching fires are suppressed as they attempt to advance and the clinging gelled water falls from the upper reaches of the fuel. Re-ignition of suppressed fires is prevented by the gel supplying continuous additional gravitating water that had clung to the upper reaches of the fuel.

Another feature and advantage of the present invention is that the gelled water contains few ingredients thus lowering the residuals on surfaces and areas where the ingredients may be carried after the fire is controlled. Because it contains few necessary ingredients in extremely small quantities, it is less costly to produce.

Another feature and advantage of the present invention is that because the gelled water has the ability to adhere to, build on, and remain upon surfaces to which it is applied such as rooftops, vertical walls of buildings, equipment, burning materials such as rubber tires, etc., it significantly decreases the quantity of water required. This is especially important when water is scarce or must be transported long distances. Because significantly less water is required, runoff is decreased and the risk of spreading any hazardous materials that may have been present and caught up in the runoff is reduced.

Another feature and advantage of the present invention is that the viscosity of the gelled water can be varied and controlled by a firefighter at the point of application by simply varying the amount of "base" and "activator" in the water flowing through to the nozzle.

Another feature and advantage of the present invention is that the gel will remain on burning and flammable materials such as wood, hydrocarbons, or rubber such as in tires, thereby cooling the surfaces so rapidly and efficiently that even the charred matter may usually be immediately handled without burning the bare skin.

Another feature and advantage of the present invention is that the gel can be utilized in conjunction with flammable fluids transportation, military and similar vehicles for personnel and equipment protection. Pressurized deployment of gel via strategically placed nozzles provide virtually instant burn protection and fire suppression in vehicles ablaze from traffic accidents or, in the case of military vehicles, those attacked by enemy weapons fire or Improvised Explosive Devices/Booby Traps. Burning tires are almost instantly extinguished on application of the breakable gel.

Another feature and advantage of the present invention is that the gel may also be sprayed on the outer garments of firefighters to protect the firefighters themselves.

Another feature and advantage of the present invention is that the gel contains no flammables, such as oils used to produce water/oil or oil/water emulsions of the prior art, and contains no volatile organic compounds (VOCs).

Another feature and advantage of the present invention is that the gel possesses excellent lubrication qualities therefore making it valuable as a runway lubricant for "wheels-up" aircraft landings with concurrent fire suppression while allowing rapid return of the runway to use by simply spraying and quickly breaking the gel thereby eliminating slippery conditions.

Another feature and advantage of the present invention is that the gel can be effectively dispensed with pinpoint accuracy from terrestrial vehicles at the point of greatest effectiveness thus eliminating the need for large airplanes dropping great quantities of location defining colored water over vast areas. Because the gelled water will cling together rather than vaporizing into a mist as it exits the nozzle, high pressure pumps can distribute the gelled water to great distances, even far up mountainsides. Treetops can be thus effectively coated to control "crown fires" that can spread rapidly as highly flammable resinous tree sap heats and explodes. From tank or trailer trucks as a water source, side and front mounted booms, or hand directed nozzles provide for efficient pinpoint high speed application of the gels upon or immediately in advance of grass, brush, or prairie fires. Because of the gel's highly effective fire suppression and fuel cooling characteristics, bumper mounted path sprayers allow vehicles to be driven upwind of a fire in recent burns thereby allowing smoke avoidance. The same or similar vehicles can be used to quickly and efficiently apply a protective gelled water coating on threatened homes, farm buildings and equipment, and later apply a breaking and removal application.

Another feature and advantage of the present invention is that the stable easily removable gel can be used for fire and slag damage protection in cutting and grinding locations where sparks and slag from cutting torches, grinding wheels, etc. inherently produce ignition sources and surrounding surface damage potential.

Another feature and advantage of the present invention is that the variable viscosity gelled water, which, in a more concentrated very viscous form, is highly effective in the control of collateral damage that results from explosions. Exploding devices buried under a mound of the gelled water of this invention produce only a small percentage of the fires and collateral damage that would otherwise be expected.

Another feature and advantage of the present invention is that it provides a safe, easily used method to not only suppress existing fires, but to also prevent the spreading of fire. The most common method for the prevention of spreading of fire from sparks from existing fires is to spray nearby surfaces such as adjacent rooftops and sides of buildings with plain water, which will almost immediately gravitate away or evaporate, thus, structures and flammable surfaces to be protected from nearby fires must be repeatedly sprayed with water to prevent their catching fire. When coated with the gelled water of the present invention a thick layer of gelled water remains. Upon exposure to heat, the outer surfaces of the gel evaporate; escape of the outer water molecules from the gel layer rapidly and efficiently cool the remaining gelled water thus greatly lengthening the duration of the presence of the water thereby enhancing fire control.

Other features and advantages of the invention will become apparent from time to time throughout the specification and claims as hereinafter related.

DESCRIPTION OF THE PREFERRED EMBODIMENTS

Figure 1:
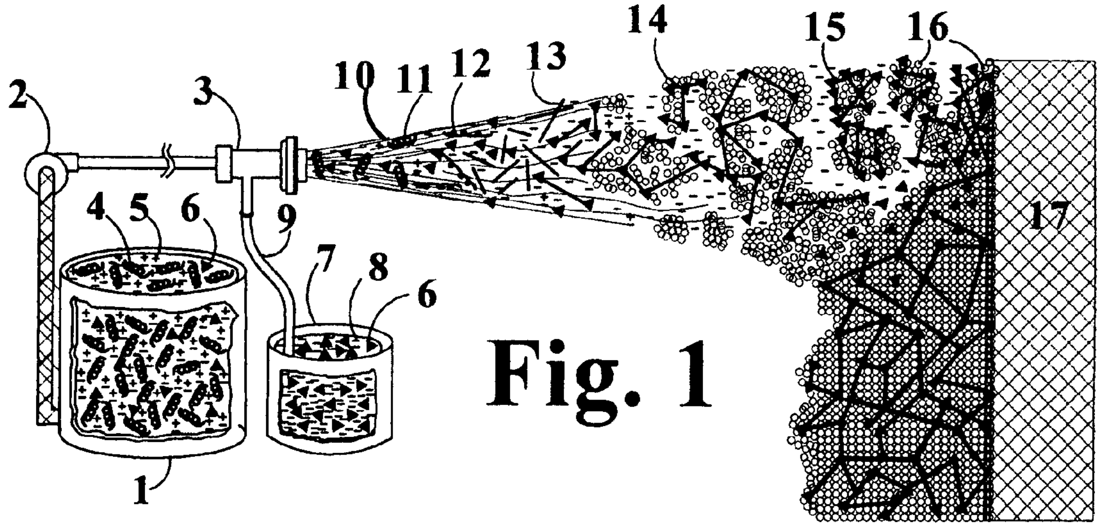
FIG. 1 and FIG. 2 are schematic illustrations showing how the breakable firefighting gel in accordance with the present invention operates in use.

The present invention relates generally to fire protection, prevention and fire extinguishing and explosion suppressing compositions and methods using variable viscosity breakable gelled water formulations that hold a layer of water of desired viscosity and thickness where placed, and then easily removed by the application of a second powdered or water based component that breaks the gel so it becomes free flowing and is easily rinsed away. It should be understood that detailed embodiments of the formulations hereafter disclosed are merely exemplary of the present invention and not all inclusive and sequence of mixing of ingredients and amounts thereof may be varied. The specific details disclosed herein are not to be interpreted as limiting but rather as a basis for the claims and as a representative basis for teaching one skilled in the art to variously practice the invention.

The Breakable Gelled Water

The following examples describe some various formulations of a breakable gel for fire fighting, suppression and prevention and other uses including, but not limited to, open fires, fires within closed locations including subterranean, effective substrate, surface and equipment cooling and lubrication and the containment of collateral damage when used to envelop explosive devices.

In a preferred formulation a "base" liquid composition is prepared which can then be mixed with plain water in an appropriate storage vessel on the truck or other equipment. An "activator" composition is added to the "base" at a point of use to increase the final viscosity of the gelled water, and if desired, a powdered or liquid "breaker" composition may be applied to the gelled water to break the gel so it becomes free flowing and is easily rinsed away.

In one example, the "base" liquid is prepared by mixing with a desired amount of water, an acid such as, but not limited to, an organic acid such as a carboxylic acid in sufficient quantity, usually about a trace to about 4.25%, to lower the acidity of the mix below pH 2. The amount of such acid necessary is primarily dependent on the characteristics and mineralization of the source water, especially its pH. To this mixture is added an alkaline electrolyte such as, but not limited to, sodium hydroxide, in sufficient quantity, usually about a trace to about 2.8%, to raise the pH slightly. To this mixture is added and thoroughly mixed about a trace to about 16.24% of a cross-linkable polymer, such as, but not limited to, a polyacrylate in a quantity sufficient to make the viscosity of the "base" gel convenient for shipping and handling. This is thoroughly mixed until a completely smooth product results. A cross-linking agent such as, but not limited to, triethanolamine (TEA) is then added for further viscosity adjustment.

The "Base" Liquid Formulation

The following is a typical example of a formulation to produce the "base" liquid mixture:

| CONSTITUENT | QUANTITY BY WEIGHT |
|---|---|
| Plain Water | From about 80% to about 99.5% |
| Organic Carboxylic Acid | From about a trace to about 4.25%, sufficient to lower the water pH to below about 2, quantity most dependent on source water pH and mineral content |
| NaOH (or other alkaline) | From about a trace to about 0.8%, sufficient to raise the water pH to above about 3 |
| Cross-linkable polymer | From about 0.004% to about 16.24% |
| Cross-linking agent such as TEA | From about 0.0013% to about 1.4% |

The "Activator" Formulation

The following is a typical example of an "activator" which is added to the "base" liquid at the point of use to increase the final viscosity of the gelled water:

| CONSTITUENT | QUANTITY BY WEIGHT |
|---|---|
| NaOH 18% in water | From about 45% to about 99% |
| Cross-linking agent such as TEA | From about 0.1% to about 15% |
| Nonionic Surfactant such as octyl phenyl ethoxylate if desired | From about 0% to about 3.0% |

The "Breaker" Formulation

A typical formulation to produce a "breaker" which is applied to the gelled water if breaking of the gel to a liquid is desired comprises either of dry cations, such as calcium chloride, sodium chloride or potassium chloride, in a powder form, or an aqueous solution of about 1% calcium chloride, sodium chloride or potassium chloride dissolved in water.

Examples of Methods of Use

In one example, from about 1% to about 25% of the "base" liquid is mixed with plain water at the point of use to make a fire fighting or explosive control water to be later gelled to the desired viscosity by the addition of the "activator". Since this prepared water contains the "base", it can be used "as is" to fight fires or, if a gel is desired, the base/water preparation may be sprayed through an eductor or other metering and proportioning device which provides for on-the-fly addition of sufficient "activator", usually about 0.05% to about 7%, to achieve the desired final gel viscosity for the particular application. The viscosity of the sprayed gel can be controlled by the proportions of the additives whether premixed or amounts allowed to pass through or metered via eductors or proportioner devices. The addition of the "activator" to the "base" dilution rapidly increases the final gel strength to virtually any consistency desired. Final rheology is proportional to the base/water concentration and amount of activator added.

Cleanup is accomplished by simply applying the powder or aqueous "breaker" to the gelled water, thereby breaking the gel into a free flowing liquid and then just rinsing.

Figure 2:
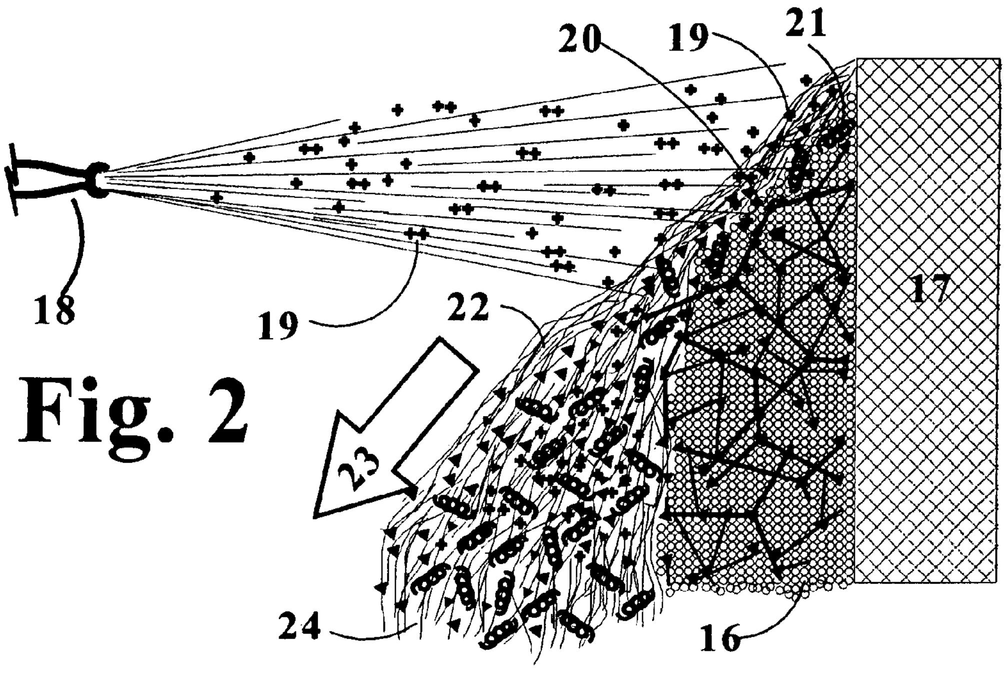

Referring to FIGS. 1 and 2 of the drawings by numerals of reference, there shown schematically, how the present breakable gelled water operates in use. As shown in FIG. 1, water containing about 5% of the "base" solution in a storage tank 1 is pumped 2 into an eductor hose nozzle 3. This fluid contains coiled polyacrylic acid molecules (PAA) 4, pH control agents 5, and coupling molecules 6. As the fluid passes across the venturi in the nozzle 3 the "activator" in storage tank 7 which contains pH elevating ions 8 plus additional coupling molecules 6 is proportionately siphoned into the flowing stream 9 to exit the nozzle 3 forming outflow 10. In the outflow 10 the components instantly chemically respond to the pH elevation and the coiled long-chained PAA molecules 11 begin to straighten 12. Viscosity of the outflow is greatly increased for molecular movement is compromised as the straightened PAA molecules 13 interfere with each other and water molecule movement. The long straight-chained PAA molecules 11 also strongly bond with the coupling molecules 14 thereby forming a physical molecular lattice 15, which builds internal support for the gel formation 16. The gel 16 clings to the target surface 17, such as the fuel or the surface to be protected.

When the removal of the gel from a surface is desired, simply sprinkling, spraying, applying, or otherwise adding the cation containing "breaker" substance, breaks the gel to a free-flowing liquid. Being preferably individual atoms, the ions quickly and easily disperse causing virtually instant breaking of the gel. As illustrated in FIG. 2, when gel 16 breaking is desired, a sprayer or shaker 18 source delivers preferably polyvalent cations 19 to the accumulated gel 16. The small cations such as calcium 19 raise the pH of the gel 16 and easily and instantly substitute for the larger cross linker molecules 20. This immediately breaks the gel supporting molecular lattice for the PAA molecules again coil 21 as they separate from the cross linking molecules. Without either the long chain PAA or molecular lattice support, the gel 16 becomes free-flowing 22 and gravitates away 24 from the contact surface 17 as a non-contaminating liquid 24.

Presolvated polyacrylic acid molecules are tightly coiled. Relatively, a polyacrylic acid molecule is so large that it responds to nearby external forces and folds on itself. The polar hydrophilic groups are turned outward while the lipophilic groups are turned inward. The carbon-chain backbone of the molecule seeks to keep itself away from water while the oxygen and hydroxyl portions of the molecule are attracted to the surrounding water. The molecule thus coils and folds into a nearly spiral or spherical configuration.

The polymer based gel of the present invention results instantaneously following the addition of basic molecules. These neutralize the acidic side chains on the polyacrylic acid prompting the previously tightly coiled and folded molecules to straighten into long chains. This neutralization ionizes the polymer generating negative charges along the backbone of the long molecule. The closely spaced negative charges within each molecule repel each other. This internal revulsion overpowers the external folding forces, thereby causing the molecules to uncurl to become long straight chains. The long straightened molecules interfere with the movement of each other causing the water carrier to thicken. Further a virtually instant increase in viscosity occurs when these long straight molecules attach to one another upon the addition of cross-linking agents such as triethanolamine. Hydrogen bonding and molecular cross-linking enable strong gel formation.

The present water based fire prevention or fire fighting gel has desired characteristics which have heretofore have been difficult to achieve in useful, economical and easy-to-use formulations. The optimal characteristics include easily sprayed breakable water gel products that are highly effective, easy-to-use in readily available equipment, low or no toxicity, and tackiness (so that it clings to the surface to which it is applied). It is also easily removed without contamination of the surfaces to which it may drain thus avoiding additional damage.

Water is a highly effective wetting agent; it is chemically attracted to many different atomic structures. However its internal strength is limited which is the reason it flows. The present formation of an internal lattice of long cross-linked molecules within provides internal strength necessary for gel formation. When sprayed, the gel will cling to most surfaces because of the affinity of water for most compositions. Additionally the gel can be built in thickness because of its internal strength and stability which result from the cross-linked internal molecular lattice which strengthens the gel.

If the present invention is to be used in an application where the water supply is from sources such as fire hydrants, the chemicals can be metered into the water as it is pumped through the pressurizing equipment aboard the pumper truck. The shear forces applied to the water by the pumps thoroughly mixes the ingredients, thus assuring proper gel formation as desired. Metering of the gelling components can also be done in a similar manner on pump equipped tanker trucks with their own water supply thus saving the cost of compounding the stored water in the event the water is used in its liquid form. Metering through an eductor by venturi aspiration or by proportioner devices is a very effective way to add the desired amount of components. An eductor is a suction device operated by hose pressure to suction fluid from a reservoir and mix it with the hose stream. Eductors are often used by firefighters to add foaming or other materials to water streams.

Another efficient application method is to utilize a double spray or fogging nozzle that delivers the "base" water dilution from one nozzle and the gel "activator" in water from another nozzle or later in the stream via the same nozzle. Mixing while in the air and upon impact causes instant conversion of the water into a stable gel clinging to the impacted surface.

The most simple application method is to pump the supply water from whatever source through a nozzle system that meters the desired portion of "base" liquid into the stream followed by subsequent terminal metering of the "activator" into the same stream, thus resulting in the output of the gel and thereby eliminating the necessity for mixing tanks.

Because the gel forms rapidly in the air after leaving the nozzles, there is no need for positive pressure pumps such as gear pumps to pump a viscous gel. Also no plugging of the nozzles occurs from internal gel accumulation.

Dispersing the gel through nozzles capable of injecting or inducing air or non-flammable gasses such as, but not limited to, nitrogen and carbon dioxide, provides for the formation of a very low specific gravity bubble laden gel which is light enough to float on the surface of liquid hydrocarbons such as diesel fuel or gasoline and therefore is extremely effective in rapidly suppressing and quenching such fires. Foam additives increase this efficiency.

In tests conducted at the Louisiana State University Fire and Emergency Training Institute at Baton Rouge, La., spraying a blazing 16' diameter tank containing diesel fuel with the present breakable gel extinguished flames over ten feet high in just over 30 seconds.

When the fire is suppressed and the danger has passed, spraying or dusting the gel protected surfaces with the ion containing "breaker materials", such as hard water from wells or any water or powder to which is added calcium such as 1% calcium chloride, sodium chloride or similar chemical, breaks the gel allowing easy rinsing away and cleanup.

When used in explosion control, surrounding an explosive device with the present gel greatly suppresses not only the fiery blast, but also slows fragments or shrapnel. The cross-linked long-chained polymer molecules that produce gelling suppress the rapid expansion of the explosion. As the long cross-linked molecules are forced outward, they attempt to pass one another or they are broken, thus absorbing energy. Since these long-chained polymer molecules are randomly cross-linked, billions of these bonds must be broken or otherwise compromised; the explosive forces are diluted. The chemical and hydrogen bonds must be overcome and broken for the explosive force to pass. At the same time, the gel is nebulized into an efficient heat and shock absorbing high surface area flame-suppressing moist molecular mist. Furthermore, the heat and force generated by explosions are further dissipated as the gelled water is converted into steam, and a huge percentage of explosive power is further exhausted in the energy dissipation in the latent heat of vaporization of the gelled water.

Louisiana State University Fire and Emergency Training Institute and Explosive Services International, LTD. conducted tests at Baton Rouge, La. on the fire and explosion suppression capacity of the breakable gel. It was found that surrounding a half pound of C-4 explosive with just two inches of the present breakable gel decreased the explosion velocity from an expected 27,000 fps to an estimated 2800 fps, an almost 90% reduction. Additionally no secondary explosion or fire resulted when the C-4 was exploded in a vapor filled confined space previously saturated with gasoline and diesel fuel. In a similar test concurrently conducted without the C-4 being gel encapsulated, there was a massive secondary explosion and subsequent fire.

Another feature of the present invention is that it provides a safe, easily used method to not only suppress existing fires and mitigate explosions, but it can also be used to prevent the spreading of fire. The most common method for the prevention of spreading of fire from sparks from existing fires is to spray nearby surfaces such as adjacent rooftops and sides of buildings with plain water, which will almost immediately gravitate away or evaporate, thus, structures and flammable surfaces to be protected from nearby fires must be repeatedly sprayed with water to prevent their catching fire. When coated with the gelled water of the present invention a thick layer of gelled water remains. Upon exposure to heat, the outer surfaces of the gel evaporate; escape of the outer water molecules from the gel layer rapidly and efficiently cool the remaining gelled water thus greatly lengthening the duration of the presence of the water thereby enhancing fire control. The gel may also be sprayed on the outer garments of firefighters to protect the firefighters themselves.

Another feature of the present invention is that the fire protective gel will remain on burning and flammable materials such as wood, hydrocarbons, or rubber such as in tires, thereby cooling the surfaces so rapidly and efficiently that even the charred matter may usually be immediately handled without burning the bare skin. Gelled water does not gravitate away from the surface to which it was applied. When a sufficient layer of gelled water is applied to burning materials, some of it converts to steam with the remaining layer of water on the fuel surface assuring almost instant cooling of the fuel to below the boiling point of water. The initial cooling rate multiple is 540, the latent heat of vaporization of water. Once cooled to the boiling point of water, further cooling is 30 times that of air, the heat transfer coefficient of water.

Typically flames are around 1500 degrees C. The fuel temperature will increase as the fire continues, thus adding to the speed of the fuel vaporization and the fire intensity. Applied gelled water extinguishes flames initially by depriving the fuel of oxygen thus eliminating the heat source. Fuel temperature is then almost instantly decreased to near 100 degrees C., the boiling point of water, as the vaporizing gelled water efficiently and rapidly cools the fuel surface that is in contact with the gelled water.

Although there will be variance depending on the thermal conductivity of the materials involved, not only will many fuels be almost instantly cooled to below their flash point but also fuels such as wood may soon be handled bare handed because they are cool to touch.

The present gel may also be used in conjunction with flammable fluids transportation, military and similar vehicles for personnel and equipment protection. Pressurized deployment of the gel via strategically placed nozzles provide virtually instant burn protection and fire suppression in vehicles ablaze from traffic accidents or, in the case of military vehicles, those attacked by enemy weapons fire or Improvised Explosive Devices/Booby Traps. Burning tires are almost instantly extinguished on application of the breakable gel of this invention. In tests conducted at the Louisiana State University Fire and Emergency Training Institute at Baton Rouge, La., less than 32 seconds per stack was required to extinguish burning tires and the tire stacks did not re-ignite.

The present fire suppressing and fire protective gel possesses excellent lubrication qualities therefore making it valuable as a runway lubricant for “wheels-up” aircraft landings with concurrent fire suppression while allowing rapid return of the runway to use by simply spraying and quickly breaking the gel thereby eliminating slippery conditions.

The fire suppressing and fire protective gel can be effectively dispensed with pinpoint accuracy from terrestrial vehicles at the point of greatest effectiveness thus eliminating the need for large airplanes dropping great quantities of location defining colored water over vast areas. Because the gelled water will cling together rather than vaporizing into a mist as it exits the nozzle, high-pressure pumps can distribute the gelled water to great distances, even far up mountainsides. Treetops can be thus effectively coated to control “crown fires” that can spread rapidly as highly flammable resinous tree sap heats and explodes. From tank or trailer trucks as a water source, side and front mounted booms, or hand directed nozzles provide for efficient pin-point high speed application of the gels upon or immediately in advance of grass, brush, or prairie fires. Because of the gel’s highly effective fire suppression and fuel cooling characteristics, bumper mounted path sprayers allow vehicles to be driven upwind of a fire in recent burns thereby allowing smoke avoidance. The same or similar vehicles can be used to quickly and efficiently apply a protective gelled water coating to threatened homes, farm buildings and equipment, and to later apply a breaking and removal fluid application.

The stable easily removable gel may also be used for fire and slag damage protection in cutting and grinding locations where sparks and slag from cutting torches, grinding wheels, etc. inherently produce ignition sources and surrounding surface damage potential.

The present breakable gel has passed EPA “Toxicity Tests” as described for Drilling Fluids using Mysid shrimp (*Mysidopsis baja*). The tests were conducted by Mudtech Laboratories, 5310 Milwee, Houston, Tex. 77092, on a 5% solution of the present breakable gel (the usual maximum necessary concentration), according to requirements stipulated in the Federal Register, Vol. 50, No. 165, Aug. 29, 1985 using sodium dodecyl sulfate as a standard reference toxicant. Toxicology tests show the polymers used in the present invention have a relatively low acute oral toxicity and pose a minimal potential for irritation of eyes or skin. No pulmonary effects have been recorded in production workers exposed to the polymers nor are they listed or regulated by IARC, NTP or OSHA as being carcinogenic. There are no known specific medical conditions aggravated by exposure to the polymers. Also the polymers are not known to be defined, or designated, as hazardous by current provisions of the Federal (EPA) Resource Conservation and Recovery Act (RCRA).

As mentioned above, The Louisiana State University Fire and Emergency Training Institute and Explosive Services International, LTD. Baton Rouge, La. conducted testing of the present fire and explosion suppression capacity of the breakable gel. Tests of the gel as a fire retardant and extinguisher were conducted for various classes of fire, including class A, B, C, D, and K fires. Oher types of fires tested included grass and brush fires, old tires, gasoline, diesel, jet fuel, crude oil, and various explosives materials. The following are a brief explanation of results and observations.

Type "A" fires are those that produce ash, i.e., wood, paper, etc. It was found that "A" type fires were easily put out with the gel using about 1/20 the amount of water as compared to just using water. The gel was also superior to water by eliminating the steam from the use of just water. The gel also worked as a retardant to an "A" type fire for >24 hours after application.

The gel when used as retardant was tested in fields of dry grass and brush as a barrier in controlled burns with 100% successful results. The gel's high viscosity allowed it to be applied to most surfaces, wood, glass, metals, grass, trees and the gel remained on vertical surfaces.

Type "B" fires are hydrocarbon fires, i.e., gasoline, diesel, crude oil, etc. It was found that "B" type fires were easily extinguished with gel that had been foamed by injecting air into the gel so that it would float on top of the fuels and other flammable liquids. The gel will also work on "B" type fires without the air injection but took more gel. The gel also prevented re-igniting of the flammable liquids.

Type "C" fires are electrical fires. It was found that "C" type fires were extinguished with the gel. Misting of the gel worked best with "C" type fires. Misting reduced the danger to the operator of electrical bleed through.

Type "D" fires are fires caused by flammable metals, such for example: magnesium, sodium, potassium, sodium-potassium alloys uranium and powdered aluminum. The "D" type fires were tested with the gel with good success, and best results were obtained when the gel mixture ratio was altered.

Type "K" fires are kitchen fires, i.e., grease, oils, etc. in homes and commercial kitchens. It was found that "K" type fires were very successfully extinguished with the gel, and that the gel was easily cleaned up after the fire using a little salt to break the gel and a few rags. Misting worked the best on these fires.

The testers also commented about the how easily old tires were extinguished with the gel, and its heat transference capability that allowed whatever was burning to be touched within just a few seconds after applying the gel.

The fire protection, prevention and fire extinguishing and explosion suppressing compositions and methods using variable viscosity breakable gelled water formulations disclosed herein are provided for illustrative purposes only and are not to be construed as limiting the scope of this invention. Many variations and applications, which do not depart from the scope and spirit of the present invention, will be apparent to those skilled in the art. All such modifications are within the intended scope of this invention. Changes may be made in details, particularly in sequence or addition of other constituents, without exceeding the scope of the invention. While this invention has been described fully and completely with special emphasis upon preferred embodiments, it should be understood that within the scope of the appended claims the invention may be practiced otherwise than as specifically described herein.

The invention claimed is:

1. A variable viscosity fire extinguishing and explosive suppression breakable gel, comprising:

a first or base solution comprising a mixture of water from about 80% to about 99.5% by weight of said mixture, an acid from about a trace to about 4.25% by weight to lower the acidity of the water below about pH 2, an alkaline electrolyte from about a trace to about 0.8% by weight to raise the water/acid mixture above about pH3, a cross-linkable polymer from about 0.004% to about 16.24% by weight to provide a viscosity suitable for shipping and handling, and a cross-linking agent from about 0.0013% to about 1.4% by weight to further adjust the viscosity, as needed; and a second or activator solution containing an alkaline electrolyte viscosity increasing agent, said first or base solution and said second or activator solution being mixed to raise the pH of said first or base solution and instantaneously trigger formation of a smooth homogeneous stable breakable gelled water having heat-absorbent, fire extinguishing, and explosion suppressant properties and a viscosity sufficient to adhere to, cling to, and build up on flammable or burning surfaces and materials when applied thereto.

2. The variable viscosity fire extinguishing and explosive suppression breakable gel according to claim 1, wherein said acid comprises an organic acid.

3. The variable viscosity fire extinguishing and explosive suppression breakable gel according to claim 2, wherein said organic acid is a carboxylic acid.

4. The variable viscosity fire extinguishing and explosive suppression breakable gel according to claim 1, wherein said alkaline electrolyte comprises sodium hydroxide.

5. The variable viscosity fire extinguishing and explosive suppression breakable gel according to claim 1, wherein said cross-linkable polymer comprises a polyacrylate.

6. The variable viscosity fire extinguishing and explosive suppression breakable gel according to claim 1, wherein said cross-linking agent comprises triethanolamine (TEA).

7. The variable viscosity fire extinguishing and explosive suppression breakable gel according to claim 1, wherein said second or activator solution comprises a mixture of an alkaline electrolyte viscosity increasing agent and water, said alkaline electrolyte viscosity increasing agent comprises about 18% by weight of said alkaline electrolyte viscosity increasing agent and water mixture; and a cross-linking agent in an amount sufficient to adjust the viscosity of said mixture of said alkaline electrolyte viscosity increasing agent and water.

8. The variable viscosity fire extinguishing and explosive suppression breakable gel according to claim 7, wherein said 18% by weight of said alkaline electrolyte viscosity increasing agent and water mixture comprises from about 45% to about 99% by weight of said second or activator solution; and said cross-linking agent comprises from about 0.1% to about 15% by weight of said second or activator solution.

9. The variable viscosity fire extinguishing and explosive suppression breakable gel according to claim 7, wherein said alkaline electrolyte viscosity increasing agent of said second or activator solution comprises sodium hydroxide.

10. The variable viscosity fire extinguishing and explosive suppression breakable gel according to claim 7, wherein said cross-linking agent of said second or activator solution comprises triethanolamine (TEA).

11. The variable viscosity fire extinguishing and explosive suppression breakable gel according to claim 8, wherein said second or activator solution further comprises:

from about 0% to about 3.0% by weight of a nonionic surfactant.

12. The variable viscosity fire extinguishing and explosive suppression breakable gel according to claim 7, further comprising:

a third or breaker material containing polyvalent cations selected from the group consisting of dry cations or aqueous cation solutions, which when applied to said gelled water breaks said gelled water into a free flowing liquid of sufficient liquidity to be easily rinsed from the surfaces and materials to which it was applied.

* * * * *